United States Patent
Shealey

(10) Patent No.: US 10,709,111 B1
(45) Date of Patent: Jul. 14, 2020

(54) PORTABLE PET WASTE CONTAINER

(71) Applicant: Rochelle Shealey, La Grange Park, IL (US)

(72) Inventor: Rochelle Shealey, La Grange Park, IL (US)

(*) Notice: Subject to any disclaimer, the term of this patent is extended or adjusted under 35 U.S.C. 154(b) by 436 days.

(21) Appl. No.: 15/831,790

(22) Filed: Dec. 5, 2017

(51) Int. Cl.
*A01K 23/00* (2006.01)
*E01H 1/12* (2006.01)

(52) U.S. Cl.
CPC ......... *A01K 23/005* (2013.01); *E01H 1/1206* (2013.01); *E01H 2001/1246* (2013.01)

(58) Field of Classification Search
CPC .... A01K 23/005; A01K 23/00; E01H 1/1206; E01H 2001/1246
See application file for complete search history.

(56) References Cited

U.S. PATENT DOCUMENTS

| | | |
|---|---|---|
| 3,986,744 A | 10/1976 | Krogstad |
| 4,102,547 A | 7/1978 | Williams |
| D285,012 S | 8/1986 | Willis |
| 6,062,168 A | 5/2000 | Host |
| 6,505,578 B1 | 1/2003 | Scott |
| 7,695,035 B2 | 4/2010 | Sumner |
| 8,100,445 B1 | 1/2012 | Brar |
| 8,196,980 B1 * | 6/2012 | Banks .................. A01K 23/005 294/1.3 |
| 9,133,592 B2 | 9/2015 | Becattini, Jr. |

FOREIGN PATENT DOCUMENTS

WO 2013136329 A 9/2013

* cited by examiner

*Primary Examiner* — Jessica B Wong
(74) *Attorney, Agent, or Firm* — Kyle A. Fletcher, Esq.

(57) ABSTRACT

The portable pet waste container comprises an enclosure with a carrying handle and a retractable scoop. An interior bag compartment at the lower front of the portable pet waste container is lined with a bag that opens to the outside with the scoop positioned several inches in front of the compartment. The portable pet waste container is placed on the ground with solid pet waste located between the bag and the scoop. A bagging control located on the handle is used to signal a control module within the portable pet waste container to initiate a bagging cycle, which involves using the scoop to pull the pet waste into the bag and pumping air out of the bag, causing it to collapse. With the collapsed bag covering the pet waste, the bagged pet waste may be removed through a bottom door of the bag compartment.

20 Claims, 5 Drawing Sheets

PORTABLE PET WASTE CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet care, more specifically, a portable pet waster container.

SUMMARY OF INVENTION

The portable pet waste container comprises an enclosure with a carrying handle and a retractable scoop. An interior bag compartment at the lower front of the portable pet waste container is lined with a bag that opens to the outside with the scoop positioned several inches in front of the compartment. The portable pet waste container is placed on the ground with solid pet waste located between the bag and the scoop. A bagging control located on the handle is used to signal a control module within the portable pet waste container to initiate a bagging cycle, which involves using the scoop to pull the pet waste into the bag and pumping air out of the bag, causing it to collapse. With the collapsed bag covering the pet waste, the bagged pet waste may be removed through a bottom door of the bag compartment.

An object of the invention is to provide an apparatus capable of bagging solid pet waste.

Another object of the invention is to provide a electrically-operated, position-agile scoop which may move solid pet waste into a bagging compartment.

A further object of the invention is to provide an electrically-operated air pump which may evacuate air from the bag containing the solid pet waste.

Yet another object of the invention is to provide a pivoting handle with a carrying position and an activation position where the activation position elevates a portion of the handle and may help reduce back strain.

These together with additional objects, features and advantages of the portable pet waste container will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable pet waste container in detail, it is to be understood that the portable pet waste container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable pet waste container.

It is therefore important that the claims be regarded as including such equivalent construction insofar as they do not depart from the spirit and scope of the portable pet waste container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
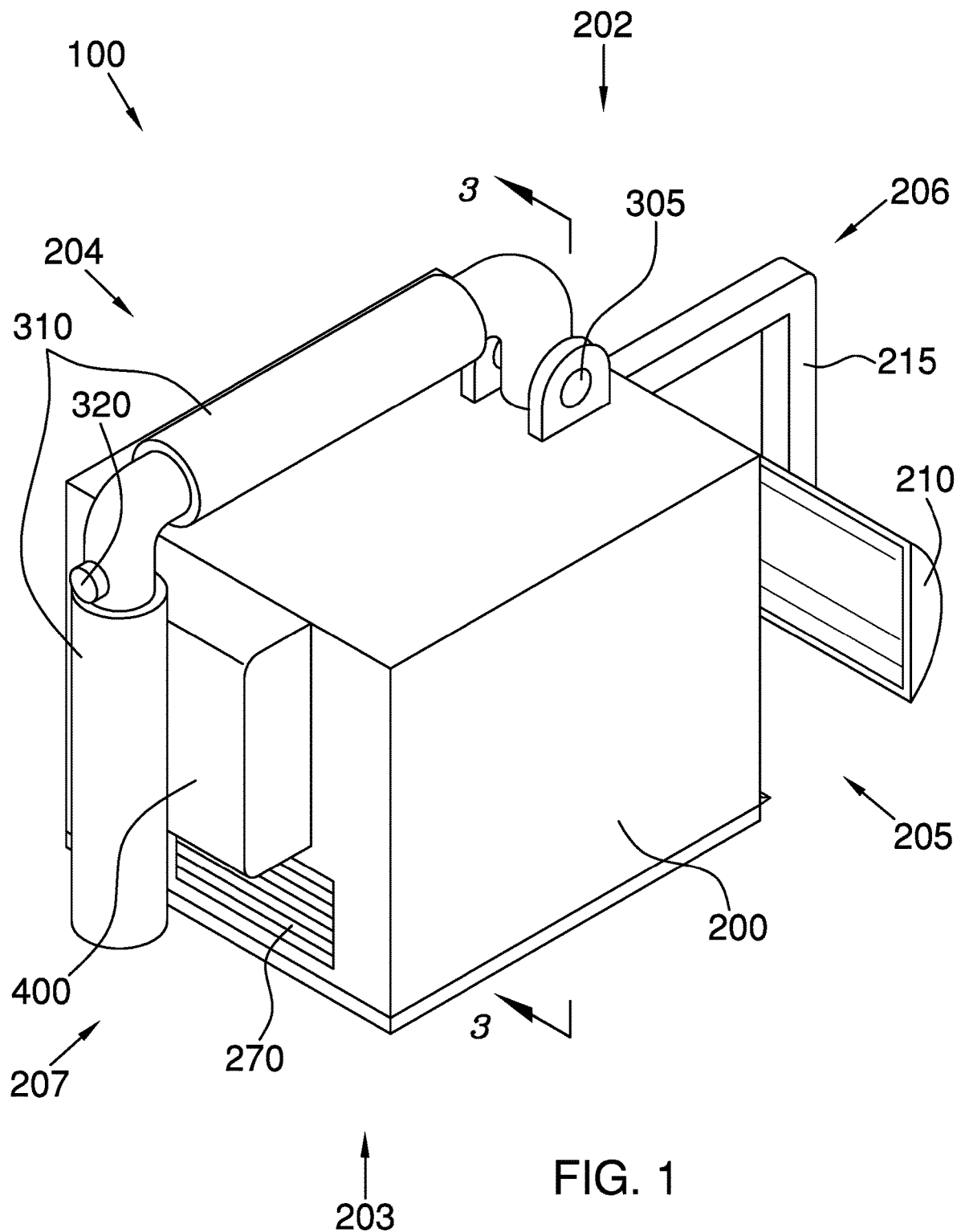
FIG. 1 is a perspective view of an embodiment of the disclosure from a rear angle showing the handle in the carrying position.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As used herein, the word "or" is intended to be inclusive. Throughout this document the terms "battery pack", "battery", and "batteries" may be used interchangeably to refer to one or more wet or dry cells or batteries of cells that provide DC power to the invention. References to recharging or replacing batteries may be construed to mean recharging or replacing individual cells, individual batteries of cells, or a package of multiple battery cells as is appropriate for any given battery technology that may be used. As used herein, the word "control" is intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the word "coupled", means connected, either directly or indirectly; the word coupled does not necessarily imply a mechanical connection. As used herein, the word "pivot" is intended to include any mechanical arrangement that allows for rotational motion. Non-limiting examples of pivots may include hinges, holes, posts, dowels, pins, points, shafts, balls, and sockets, either individually or in combination. Throughout this document references to 'wire', 'wires', or 'wiring' may describe and/or show a single conductor when, in fact, two conductors may be required to power a subsystem; a convention used herein is to not show the common return conductor to which all electrical subsystems are connected—this common return conductor is a continuous electrical path and does not pass through any type of switch or other electrical component other than the possibility of passing through one or more connectors. As used herein, the word "substantially" is intended to mean that two or more values are the same except for a margin of error related to variances in materials, manufacturing processes, craftsmanship, installation, environmental conditions, or other factors that may influence the values and that such margin of error is tolerable.

Figure 2:
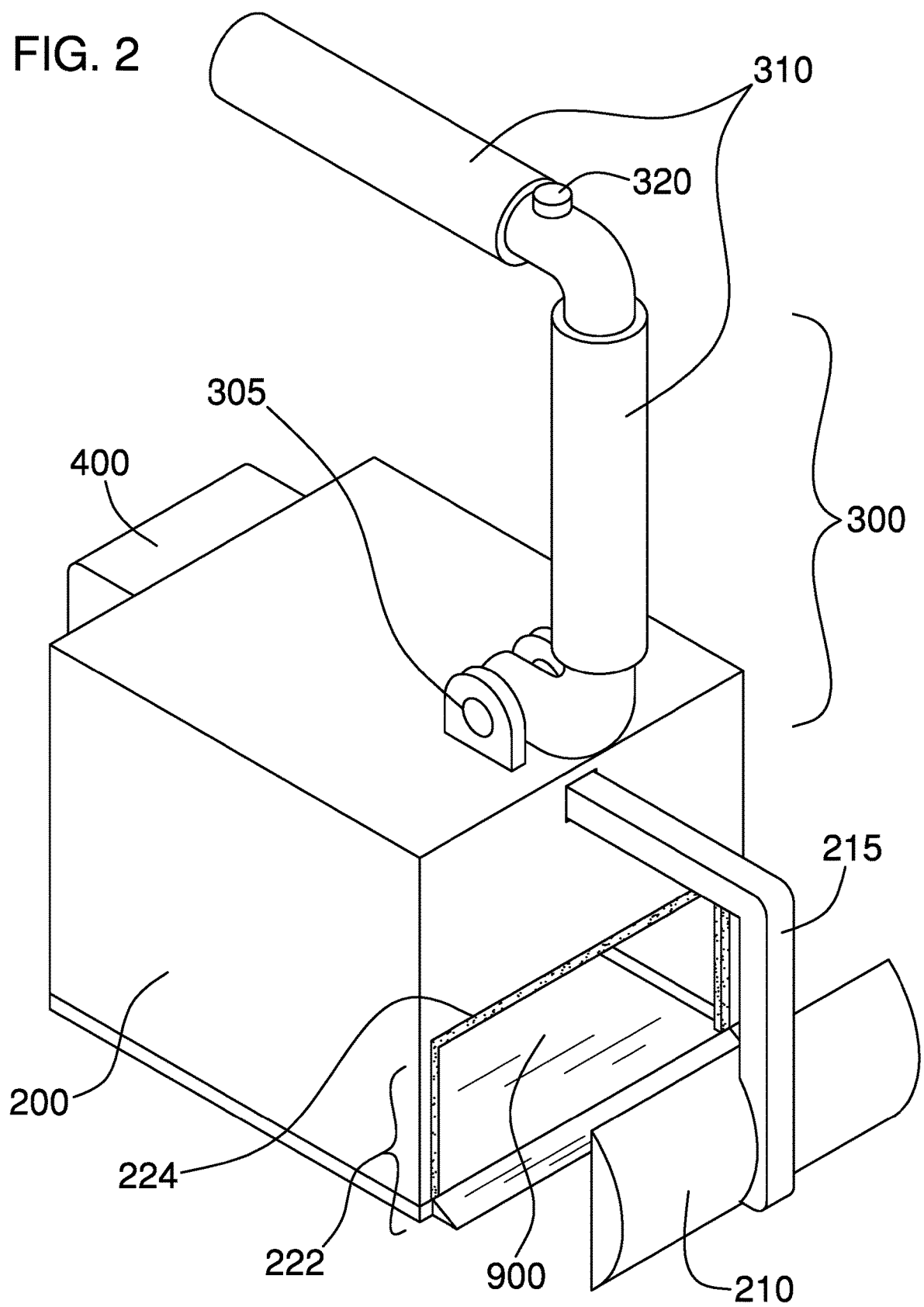
FIG. 2 is a perspective view of an embodiment of the disclosure from a front angle showing the handle in the activation position.
Figure 3:
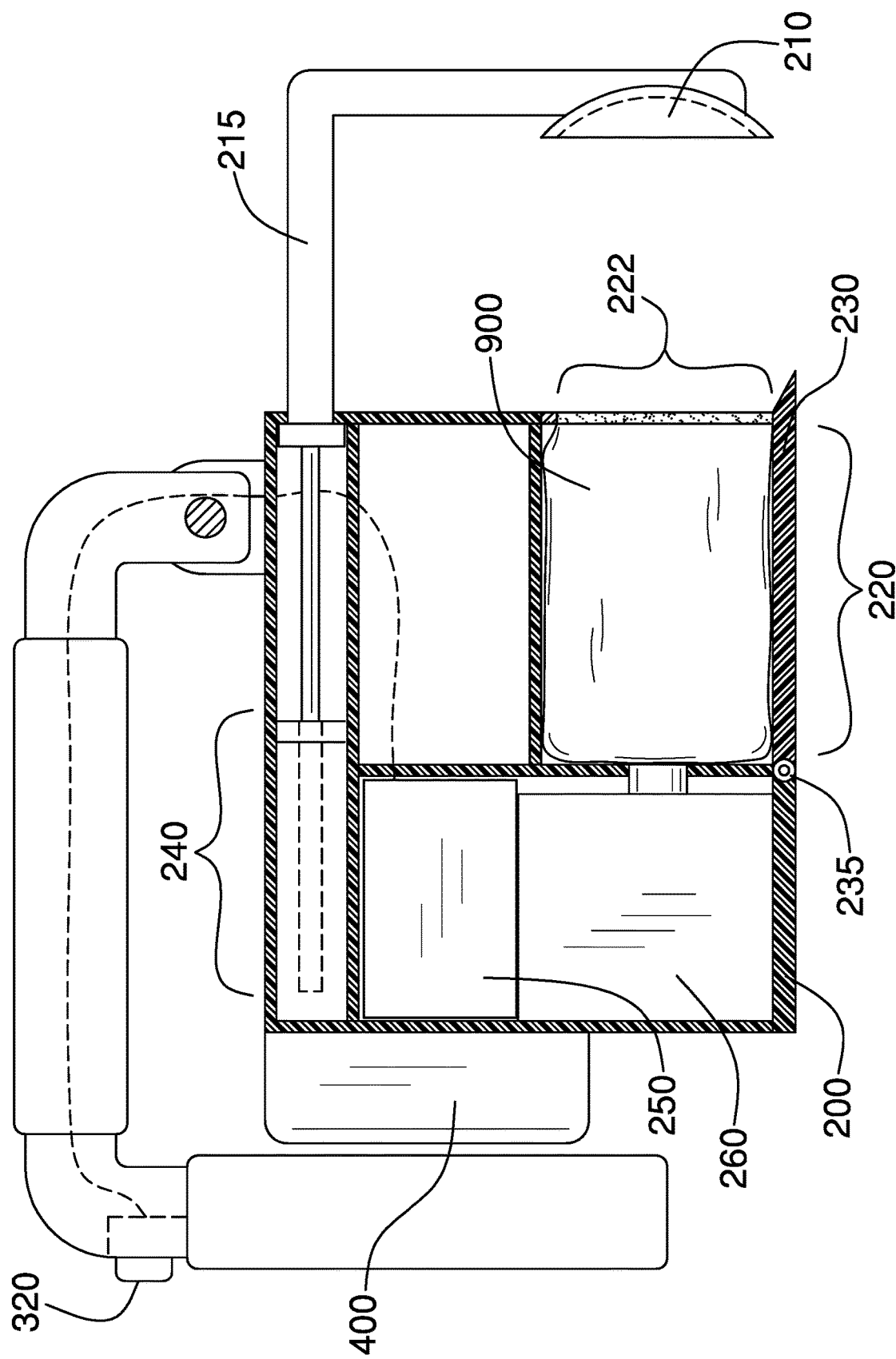
FIG. 3 is a cross-sectional view of an embodiment of the disclosure across 3-3 as shown in FIG. 1.
Figure 4:
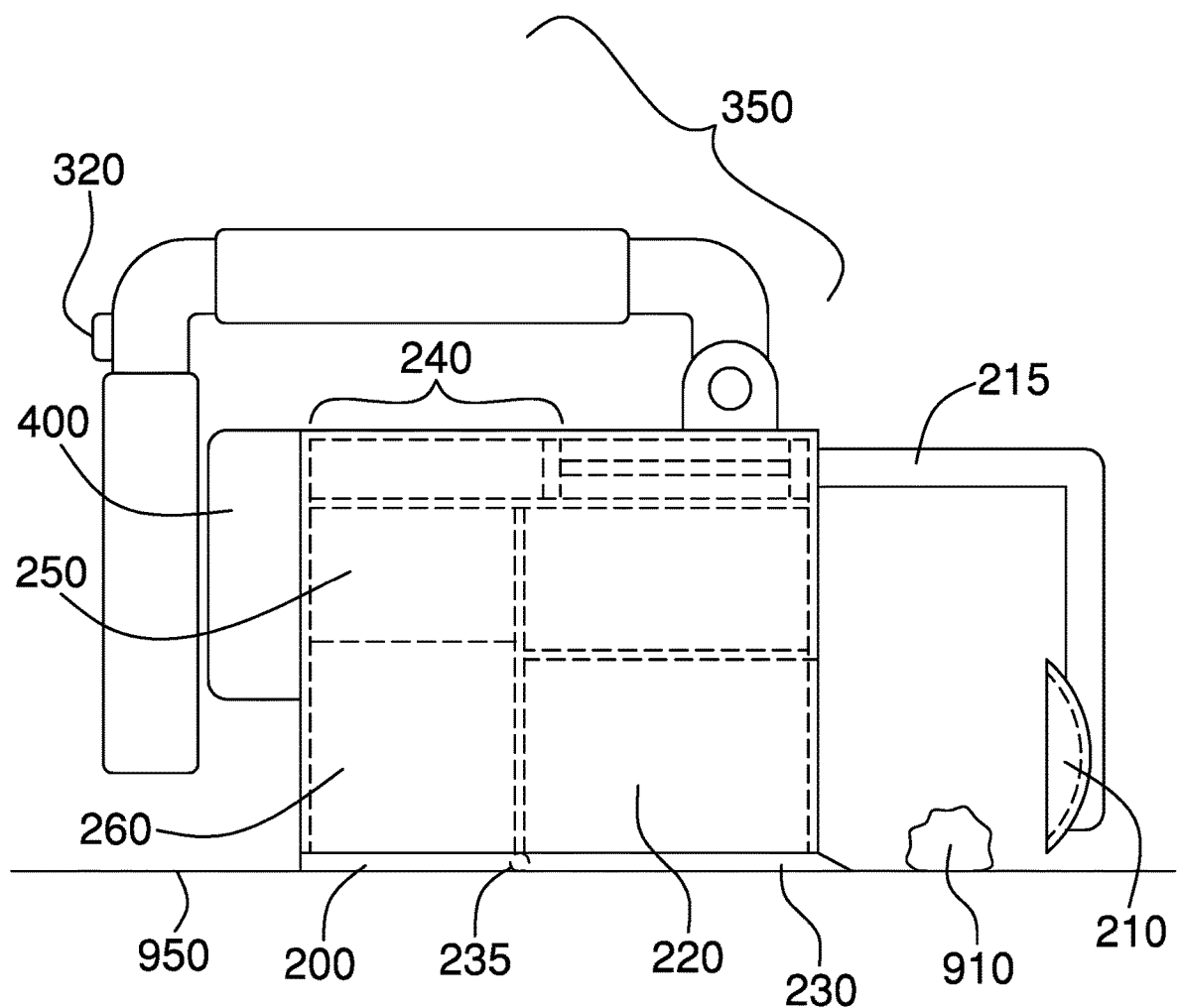
FIG. 4 is a detail view of an embodiment of the disclosure showing the handle in the carrying position and the scoop fully extended.
Figure 5:
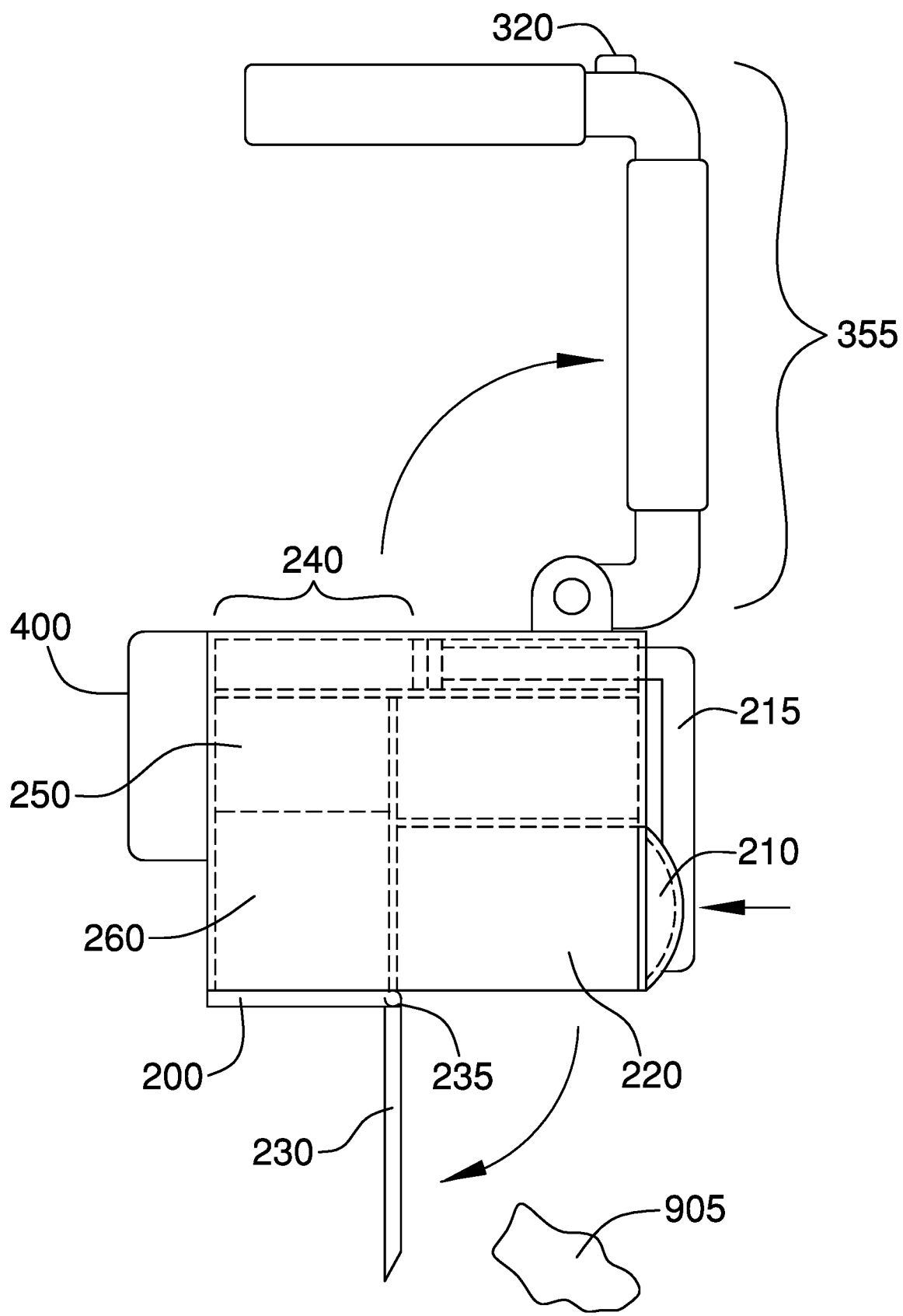
FIG. 5 is a detail view of an embodiment of the disclosure showing the handle in the activation position and the scoop fully retracted with the bottom door open.

Detailed reference will now be made to a first potential embodiment of the disclosure, which is illustrated in FIGS. 1 through 5.

The portable pet waste container 100 100 (hereinafter invention) comprises an enclosure 200, a handle 300 and a scoop 210. The invention 100 allows a pet owner (not shown in figures) to collect solid pet waste 910 by placing the invention 100 next to the solid pet waste 910 and activating a bagging control 320 on the handle 300. When activated, the invention 100 moves the scoop 210 to pull the solid pet waste 910 into a bag compartment 220 that is lined with a bag 900. An air pump 260 pumps air out of the bag 900, causing the bag 900 to collapse around the solid pet waste 910. Bagged pet waste 905 is then dropped out of the invention 100 through a bottom door 230 and may be disposed of.

The enclosure 200 may be a housing that comprises the bag compartment 220, the air pump 260, a scoop actuator 240, and a control module 250. The enclosure 200 has a top 202, a bottom 203, a left 204, a right 205, a front 206, and a rear 207. The bag compartment 220 is a cavity within the enclosure 200, which is located at the front, bottom of the enclosure 200. The bag compartment 220 opens to the outside of the enclosure 200 via a bag aperture 222 located on the front side of the enclosure 200. In some embodiments, the bag aperture 222 may be surrounded by a scoop seal 224. The scoop seal 224 may be a rubber seal located on the front side of the enclosure 200 that creates an airtight seal between the scoop 210 and the bag compartment 220 when the scoop 210 has been pulled towards the enclosure 200.

The bottom door 230 forms the bottom of the bag compartment 220. The bottom door 230 may couple to the enclosure 200 via a door hinge 235, which is located at the rear of the bottom door 230. The door hinge 235 may be a spring-loaded hinge that holds the bottom door 230 closed. When the bagged pet waste 905 occupies the bag compartment 220, the bottom door 230 may be opened by pivoting the bottom door 230 at the door hinge 235 so that the bagged pet waste 905 may fall out of the enclosure 200. In some embodiments, the weight of the bagged pet waste 905 cause the bottom door 230 to open when the enclosure 200 is lifted off of the ground 950.

The bag 900 may be placed into the bag compartment 220 such that the bag 900 lines the top, bottom, rear, and side walls of the bag compartment 220 but is left open at the front of the bag compartment 220. The bag 900 may have an aperture on the end that is against the rear wall of the bag compartment 220 through which air may be drawn from the bag 900 via a pump aperture 265 on the rear wall of the bag compartment 220. In some embodiments, the bag 900 may have a bag flange 902 that aligns with the pump aperture 265. The bag flange 902 may be an elongation of the bag 900 surrounding the aperture of the bag 900. The bag flange 902 may help to keep the bag 900 and the pump aperture 265 in alignment and may stiffen the bag 900.

The air pump 260 may be located immediately behind the bag compartment 220. The air pump 260 may be used to pump air out of the bag 900 located in the bag compartment 220 via the pump aperture 265. Operation of the air pump 260 may be under control of the control module 250. The air pump 260 may expel air through a pump vent 270 located on the rear of the enclosure 200.

The scoop actuator 240 may be an electrically operated linear actuator and may be located in an upper compartment of the enclosure 200. The scoop actuator 240 couples to a scoop arm 215 which may exit the enclosure 200 from the upper, front wall of the enclosure 200. The scoop arm 215 is coupled to the scoop 210, so as the scoop actuator 240 moves the scoop arm 215 it also moves the scoop 210. Operation of the scoop actuator 240 is under control of the control module 250. When an actuator electrical signal having a first polarity is applied to the scoop actuator 240, the scoop actuator 240 pulls the scoop arm 215 into the enclosure 200 and the scoop 210 moves towards the enclosure 200. When the actuator electrical signal having a second polarity is applied to the scoop actuator 240, the scoop actuator 240 pushes the scoop arm 215 out of the enclosure 200 and the scoop 210 moves away from the enclosure 200. When no electrical signal is applied to the scoop actuator 240 then the scoop actuator 240 does not move.

A handle pivot 305 may be located at the top, front, center of the enclosure 200. The handle pivot 305 may couple the handle 300 to the enclosure 200.

The handle 300 may be a generally L-shaped armature that couples to the top of the enclosure 200. The handle 300 may pivot between a carrying position 350 and an activation position 355. The pivoting point may be the handle pivot 305. The handle 300 may comprise one or more handle grips 310 which make the invention 100 more comfortable to hold and which reduce the likelihood of dropping the invention 100. The bagging control 320 may be located on the handle 300. The bagging control 320 may be a momentary contact push button switch that signals the control module 250 to start a bagging cycle.

In the carrying position 350, the handle 300 may extend horizontally over the top of the enclosure 200 towards the rear of the enclosure 200 and then bends down towards the ground 950. In this position, the horizontal portion of the handle 300 may be used to carry the invention 100. (See FIG. 4).

In the activation position 355, the handle 300 may extend vertically up from the enclosure 200 and then bends towards the rear of the enclosure 200. In this position, a portion of the handle 300 is in an elevated position, which may reduce back strain for the pet owner. In some embodiments, the bagging control 320 may be located on a portion of the handle 300 that is at the top of the invention 100 when the handle 300 is in the activation position 355. This may place the bagging control 320 in an elevated position and therefore make the bagging control 320 more accessible. (See FIG. 5.)

The scoop 210 may be a surface that is suspended in front of the bag compartment 220 by the scoop arm 215. In some embodiments, the distance between the bag compartment 220 and the scoop 210 may be 5.0 inches+/−2.0 inches. When the scoop actuator 240 pulls the scoop arm 215 towards the enclosure 200, the scoop 210 may pull the solid pet waste 910 into the bag 900 that lines the bag compartment 220. In some embodiments, the scoop 210 may have a concave shape to better control the movement of the solid pet waste 910.

The control module 250 may be a circuit board comprising electrical circuitry and wiring necessary to coordinate the activities of the invention 100. As a non-limiting example, the control module 250 may comprise discrete digital or analog electrical components, one or more microcontrollers, one or more memory components, passive electrical components, one or more timers circuits, and/or other electrical components needed to effect the control functions described herein. The control module 250 may be powered by a battery 400 and may comprise interconnections to the bagging control 320 and the air pump 260.

The basic operation of the control module 250 is to perform the bagging cycle. The bagging cycle begins when the bagging control 320 is activated by the pet owner. Upon receiving an activation signal from the bagging control 320, the control module 250 sends the actuator electrical signal having the first polarity to the scoop actuator 240, causing the scoop actuator 240 to pull the scoop 210 towards the enclosure 200. In the process, the scoop 210 pulls the solid pet waste 910 into the bag 900, which lines the bag compartment 220. When the scoop 210 has been pulled all of the way in, the scoop 210 presses against the scoop seal 224 that surrounds the bag aperture 222, thus forming an air-tight seal at the bag aperture 222.

The control module 250 then activates the air pump 260 by sending a pump signal to the air pump 260. The air pump 260 draws air in from the bag 900 through the bag aperture 222 and blows the air out of the rear of the enclosure 200. As air vacates the bag 900, air pressure surrounding the bag 900 causes the bag 900 to collapse around the solid pet waste 910. To complete the bagging cycle, the control module 250 deactivates the air pump 260, the control module 250 sends the actuator electrical signal having the second polarity to the scoop actuator 240 which causes the scoop actuator 240 to push the scoop 210 away from the enclosure 200, and the pet owner lifts the invention 100 off of the ground 950 and removes the bagged pet waste 905 via the bottom door 230. The scoop 210 returns to its original position at its maximum distance away from the enclosure 200.

The battery 400 may provide a source of electrical energy to power the control module 250, the air pump 260, and the scoop actuator 240. The battery 400 may mechanically couple to the rear side of the enclosure 200. The battery 400 may electrically couple to the control module 250 via a battery interconnection (not illustrated in the figures). The battery 400 may be rechargeable by coupling a power adapter (not illustrated in the figures) to a recharging port (not illustrated in the figures). The recharging port may be incorporated into the battery 400 or it may be located on the enclosure 200 and wired from there to the battery 400.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A portable pet waste container comprising:
   an enclosure, a handle and a scoop;
   wherein the portable pet waste container is adapted to allow a pet owner to collect solid pet waste by placing the portable pet waste container next to the solid pet waste and activating a bagging control on the handle;
   wherein the portable pet waste container moves the scoop to pull the solid pet waste into a bag compartment that is lined with a bag;
   wherein an air pump pumps air out of the bag, causing the bag to collapse around the solid pet waste;
   wherein bagged pet waste is then removed from the portable pet waste container through a bottom door.

2. The portable pet waste container according to claim 1 wherein the enclosure is a housing that comprises the bag compartment, the air pump, a scoop actuator, and a control module;
   wherein the enclosure has a top, a bottom, a left, a right, a front, and a rear;
   wherein the bag compartment is a cavity within the enclosure which is located at the front, bottom of the enclosure;
   wherein the bag compartment opens to the outside of the enclosure via a bag aperture located on the front side of the enclosure.

3. The portable pet waste container according to claim 2 wherein the bag aperture is surrounded by a scoop seal;
   wherein the scoop seal is located on the front side of the enclosure and creates an airtight seal between the scoop and the bag compartment when the scoop has been pulled towards the enclosure.

4. The portable pet waste container according to claim 3 wherein the bottom door forms the bottom of the bag compartment;
   wherein the bottom door couples to the enclosure via a door hinge which is located at the rear of the bottom door;
   wherein the door hinge is a spring-loaded hinge that holds the bottom door closed;
   wherein when the bagged pet waste occupies the bag compartment, the bottom door is opened by pivoting the bottom door at the door hinge so that the bagged pet waste falls out of the enclosure.

5. The portable pet waste container according to claim 4 wherein the weight of the bagged pet waste cause the bottom door to open when the enclosure is lifted off of the ground.

6. The portable pet waste container according to claim 4 wherein the bag is placed into the bag compartment such that the bag lines the top, bottom, rear, and side walls of the bag compartment but is left open at the front of the bag compartment;

wherein the bag has an aperture on the end that is against the rear wall of the bag compartment through which air is drawn from the bag;

wherein air is drawn from the bag via a pump aperture on the rear wall of the bag compartment.

7. The portable pet waste container according to claim 6 wherein the bag has a bag flange that aligns with the pump aperture;

wherein the bag flange is an elongation of the bag surrounding the aperture of the bag;

wherein the bag flange helps to keep the bag and the pump aperture in alignment and stiffens the bag.

8. The portable pet waste container according to claim 6 wherein the air pump is located immediately behind the bag compartment;

wherein operation of the air pump is under control of the control module;

wherein the air pump expels air through a pump vent located on the rear of the enclosure.

9. The portable pet waste container according to claim 8 wherein the scoop actuator is an electrically operated linear actuator;

wherein the scoop actuator is located in an upper compartment of the enclosure;

wherein the scoop actuator couples to a scoop arm which exits the enclosure from the upper, front wall of the enclosure;

wherein the scoop arm is coupled to the scoop;

wherein as the scoop actuator moves the scoop arm it also moves the scoop;

wherein when an actuator electrical signal having a first polarity is applied to the scoop actuator, the scoop actuator pulls the scoop arm into the enclosure and the scoop moves towards the enclosure;

wherein when the actuator electrical signal having a second polarity is applied to the scoop actuator, the scoop actuator pushes the scoop arm out of the enclosure and the scoop moves away from the enclosure;

wherein when no electrical signal is applied to the scoop actuator then the scoop actuator does not move.

10. The portable pet waste container according to claim 9 wherein a handle pivot is located at the top, front, center of the enclosure;

wherein the handle pivot couples the handle to the enclosure.

11. The portable pet waste container according to claim 10 wherein the handle is an L-shaped armature that couples to the top of the enclosure;

wherein the handle pivots at the handle pivot between a carrying position and an activation position;

wherein the handle comprises one or more handle grips which make the portable pet waste container more comfortable to hold and which reduce the likelihood of dropping the portable pet waste container;

wherein the bagging control is located on the handle;

wherein the bagging control signals the control module to start a bagging cycle.

12. The portable pet waste container according to claim 11 wherein when in the carrying position, the handle extends horizontally over the top of the enclosure towards the rear of the enclosure and then bends down towards the ground;

wherein when in the carrying position, the horizontal portion of the handle is used to carry the portable pet waste container.

13. The portable pet waste container according to claim 12 wherein when in the activation position, the handle extends vertically up from the enclosure and then bends towards the rear of the enclosure;

wherein when in the activation position a portion of the handle is in an elevated position which is adapted to reduce back strain for the pet owner.

14. The portable pet waste container according to claim 13 wherein the bagging control is located on a portion of the handle that is at the top of the portable pet waste container when the handle is in the activation position.

15. The portable pet waste container according to claim 14 wherein the scoop is a surface that is suspended in front of the bag compartment by the scoop arm;

wherein when the scoop actuator pulls the scoop arm towards the enclosure, the scoop pulls the solid pet waste into the bag that lines the bag compartment.

16. The portable pet waste container according to claim 15 wherein the distance between the bag compartment and the scoop is 5.0 inches+/−2.0 inches.

17. The portable pet waste container according to claim 15 wherein the scoop has a concave shape to better control the movement of the solid pet waste.

18. The portable pet waste container according to claim 17 wherein the control module is a circuit board comprising electrical circuitry and wiring necessary to coordinate the activities of the portable pet waste container;

wherein the control module is powered by a battery;

wherein the control module comprises interconnections to the bagging control and to the air pump.

19. The portable pet waste container according to claim 18 wherein the basic operation of the control module is to perform the bagging cycle.

20. The portable pet waste container according to claim 19 wherein the battery provides a source of electrical energy to power the control module, the air pump, and the scoop actuator;

wherein the battery mechanically couples to the rear side of the enclosure;

wherein the battery electrically couples to the control module via a battery interconnection;

wherein the battery is rechargeable by coupling a power adapter to a recharging port.

\* \* \* \* \*